United States Patent [19]
Hurth

[11] Patent Number: 6,113,115
[45] Date of Patent: Sep. 5, 2000

[54] WINTER SPORTS DEVICE

[75] Inventor: Peter Hurth, Adolf-Reichwein-Str. 99, 61267 Neu-Anspach, Germany

[73] Assignee: Peter Hurth, Neu-Anspach, Germany

[21] Appl. No.: 08/995,021

[22] Filed: Dec. 19, 1997

Related U.S. Application Data

[63] Continuation-in-part of application No. 08/411,646, Jun. 1, 1995, abandoned.

[51] Int. Cl.$^7$ ....................................................... B62B 9/99
[52] U.S. Cl. .......................... 280/15; 280/14.1; 280/818; 280/607
[58] Field of Search ................................. 280/601, 14.1, 280/14.2, 15, 818, 11.14, 607, 618

[56] References Cited

U.S. PATENT DOCUMENTS

| | | | |
|---|---|---|---|
| 2,609,210 | 9/1952 | Jenngins | 280/14.2 |
| 4,175,759 | 11/1979 | Strunk | 280/14.2 |
| 4,334,691 | 6/1982 | Scheib | 280/14.1 |
| 4,363,495 | 12/1982 | Henson | 280/14.2 |
| 4,449,735 | 5/1984 | McDougall | 280/818 |
| 4,725,069 | 2/1988 | Stampacchia et al. | 280/607 |
| 5,458,370 | 10/1995 | Melcher | 280/817 |
| 5,547,204 | 8/1996 | Gamzo | 280/14.2 |
| 5,558,354 | 9/1996 | Lion | 280/607 |

FOREIGN PATENT DOCUMENTS

| | | | |
|---|---|---|---|
| 1265693 | 5/1961 | France | 280/818 |
| 2806883 | 2/1979 | Germany | 280/818 |
| 3628111 | 3/1988 | Germany | 280/818 |
| 94/07578 | 4/1994 | Germany | 280/818 |

*Primary Examiner*—J. J. Swann
*Assistant Examiner*—James S. McClellan
*Attorney, Agent, or Firm*—Vidas, Arrett & Steinkraus, P.A.

[57] ABSTRACT

The present invention discloses a sports device for sliding on an underlying surface, in particular a winter sports device, having parallel skates having sliding surfaces, at least one connecting member running transversely with respect to, and jointedly interconnecting, the skates such that the sliding surfaces of the skates lie substantially parallel to each other, a standing plate and at least one swivelling lever for securement of the foot engaging device on each connecting member, wherein each swivelling lever is articulated jointedly on the connecting member by means of an offset axle member for producing an acentric swivelling axis, wherein on each connecting member (crossbar) there are arranged at least two swivelling levers symmetrically and eccentrically with respect to the longitudinal axis of the winter sports device on each side, and wherein the swivelling levers are arranged in plan view at least partially outside the eccentric swivelling axes, which represent the connection between connecting member (crossbar) and swivelling lever.

9 Claims, 15 Drawing Sheets

WINTER SPORTS DEVICE

CROSS REFERENCE TO RELATED APPLICATIONS

This application is a Continuation-in-Part of U.S. application Ser. No. 08/411,646, filed on Jun. 1, 1995 now abandoned, which is herein incorporated by reference in its entirety and which is a national stage application of PCT/EP93/0271, having an international priority date of Oct. 5, 1992.

BACKGROUND OF THE INVENTION

The invention relates to a sports device for sliding on the respective underlying surface, in particular a winter sports device.

Today there are on the market many different sports devices which all serve for sliding on inclined surfaces covered by snow or ice. In this respect there must be a distinction drawn between systems having one skate or having a plurality of skates in just the same way as a distinction must be drawn in the case of winter sports devices having two skates as to whether these skates can be moved independently of each other by the user.

The typical case of a winter sports device having two skates to be moved independently of each other is a pair of skis, with which in each case one ski is connected securely to one foot by means of a binding. Derived from this was, for example, the mono-ski, which is equipped with only one skate and with which both legs are secured on only one skate, usually by means of an intermediate plate.

A further representative of a winter sports device having only one skate is the so-called snowboard, with which however, in contrast to a ski, the user does not stand in the traveling direction but with one leg across and the other oblique to the traveling direction.

The disadvantage of a snowboard is that, when traveling on the edge, as is necessary in particular on relatively steep and icy slopes very great effort has to be expended for this edging on account of the width of the snowboard if about 24–35 cm. In addition, there are no additional supporting elements, such as for instance ski sticks, available for this.

In order to remedy this disadvantage, there have been developed winter sports devices which have fitted underneath a standing plate, on which the user can even stand in different positions, skates which, by means of a mechanism, transfer an edging movement of the standing plate to the skates, such as German Utility Model G 86 26 399.4 or German Patent P 37 44 613 "Wintersport-gerät" (winter sports device).

All these devices were however, either of a complex design with regard to their mechanism or the mechanism used produced only a very indirect transmission of the change in load instigated by the user to the skates and vice versa, which ultimately has the consequence of spongy and unsteady traveling characteristics.

Furthermore, Austrian Pat. 372 052 shows a winter sports device of the same generic type having just a standing plate, in the case of which the skates are operatively connected to the connecting member on the one hand and the connecting member is operatively connected to the standing plate on the other hand at the front and rear by means of only one swiveling axis in each case. The edging movement is transmitted via a gear mechanism.

Also in the case of other types of sport, for example the water sports of surfing, windsurfing, water skiing, the sliding device is supported on the underlying surface by its surfaces and edges, it being possible for the edging movements intended in the present case to bring advantages. Therefore, a sports device according to the invention can be used not only for winter sport but also with corresponding modifications with regard to weight, loading and securing devices for the user, for these said types of water sport.

It is therefore the object of the present invention to provide a sports device of the generic type with which sharp edging of the sliding surfaces is possible with only little effort and nevertheless irregularities of the ground are transmitted rapidly and directly from the skate to the user and vice versa.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

SUMMARY OF THE INVENTION

The sports device is described below exclusively by the example of a winter sports device using the vocabulary customary in such a case, without this being intended to restrict the invention to winter sport.

With such a winter sports device is it intended for optimum use to be possible both on slopes covered by deep snow and slopes covered by ice. In addition, the user can stand on the winter sports device in any desired direction and freely choose the type of connection with the standing plate or the standing plates. In an extreme case, the standing plate can also be used as a sitting surface.

The edging movement is transmitted from the skates to the standing plate or vice versa by either the swiveling axes between the individual, interconnected parts not running parallel to the longitudinal direction of the winter sports device, but being positioned obliquely thereto, or in the case of parallel arrangement—there being parallelogram levers assisting this. In the horizonal plan, that is to say parallel to the plane of the sliding surfaces in the rest position, this oblique positioning may lie obliquely with respect to the traveling direction, as a result of which a different longitudinal offset of the skates with respect to each other takes place upon edging in the two different directions. For this reason, an oblique positioning of the swiveling axes in a plane which is perpendicular to the plane of the sliding surfaces and runs in a longitudinal direction in appropriate, since as a result the longitudinal offset of the skates in both directions is identical to each other.

In principle, there may be any number of skates articulated in parallel next to one another at the connecting member, generally a crossbar.

Similarly, depending on the specific intended use or traveling style aimed for, it is also possible to choose between only one standing plate or two separate standing plate, which are arranged parallel next to each other and in turn are secured to the corresponding connecting members, or the direct securement of the user by means of a binding etc., without swiveling levers, but with analogous movement capability to the connecting members, so that the function of the swiveling lever is taken over by the component secured directly to the connecting member.

The number of connecting members is also variable: generally, two connecting members arranged at a distance one behind the other in a longitudinal direction, that is to say crossbars, are used, on or between which the one or two standing plates are secured. With adequate dimensioning, that is to say also adequate length of the being axes of the components movable with respect to one another it is also possible however for a single crossbar to be adequate which in that case is relatively large in the longitudinal direction. Disadvantage of using only one such crossbar is, however, the difficulty in accomplishing as low a position as possible of the standing plate which is necessary for good traveling characteristics of the winter sports device.

Another variant is to use two connecting units, each of which has at least one crossbar and, at a short axial distance therefrom, a further jointed connection of the swiveling lever to the skate. Crossbars and jointed connection are in this case arranged eccentrically and opposite each other with respect to the longitudinal center of the skates, as a result of which the transmission of force from the standing plate to the skates is facilitated. In this case, the jointed connection, which corresponds approximately to the prongs of one of the crossbars, may also be competed to give in each case a second crossbar per connecting unit.

A further variant is that of two cross bars which have only a single, common longitudinal center plate.

It goes without saying that in particular in the case of a solution with two separate standing plates the swiveling lever may be functionally combined with the standing plate, so that the standing plate can consequently be arranged directly on the connecting members, that is to say for example the crossbars.

Similarly, the length of the prongs of the cross bar depends in particular on the dimensioning of the skates in the transverse direction, since the length of the prongs must ensure an edging of the skates as far as approximately in the vertical position above each other and consequently must amount approximately to a free length of half the width of the skates if the securement on the skates take space in their center, or slightly more if the securement takes place eccentrically on the skates.

It should also be ensured here that the standing plate or the securing of the securing of the standing plate is slightly variable in its length between two connection members, in order to utilize fully the flexibility of the skates in the region underneath the standing plate. This is so since, in the case of a securing of the standing plate between two crossbars where the distance between these securing points is rigid, as a result apart form the clearance in the joints the distance between the securing points of the connecting member on the skates is also fixed so that the skates thus cannot flex etc., since this would result in a difference in length in this region.

However, it is important for the function of the device that the skates are designed to bed more flexible and compliant to the loading by vertically occurring forces in the central region, that is to say the region underneath the standing plate and between the securing points of the connecting members (that is to say the crossbars) on the skates, than in the region of the securement of the crossbars. Only in this way is it possible that, for example when the tips of the sliding surfaces are bent up by an elevation of ground, etc., the entire skate is deformed such that its point flexed furthest in the downward direction is located in the central region.

For this purpose, it is also necessary that the securing of the crossbars to the skates allows a certain mobility about a transversely running, horizontal axis, in order to permit this flexing in the central region. This possibility can also be provided by a corresponding jointedness being possible, with length compensation between the standing plate on the one hand and the swiveling levers on the other hand.

This may be carried out by a short intermediate lever at an end of the standing plate toward the swiveling lever or the crossbar or by a flexibility of the change in length on the standing plate or between standing plate and the adjoining components.

Another possibility is not to fix the securing points of the crossbars to the skates with regard to their distance, but to design one of the securements to be movable in the longitudinal direction. Thus, skate and crossbar may, for example, be guided displaceably on each other in the longitudinal direction, a previously fixed rest position being resumed by means of spring biasing when the device is not being loaded.

In the case of an embodiment of the winter sports device having two standing plates and two crossbars, the standing plates are generally secured by means of swiveling levers between the front and rear crossbars. In this case, the swiveling levers have, where present as an individual part, at least one leg which is horizontal in the neutral position, protrudes outward from the swiveling axis toward the crossbar and serves as an articulating part for the front or rear end of a standing plate. This transversely running leg is in this case intended to be arranged as low as possible, in order also to permit a lowest possible position of the standing plate.

The transversely running leg is therefore arranged by means of a vertically rising leg only so far above the skate that, during full edging, that is to say arrangement of the, for example, three skates one above the other, the horizontal leg of the upper intermediate piece still just runs over the upper surface of the upper skate, and as a result a collision between skate and standing plate is avoided.

This difference in height between the transversely running leg and the upper surface of the skate can be all the smaller the further out the swiveling axis between swiveling lever on the one hand and crossbar on the other hand lies on the crossbar.

In the case of such a winter sports device, the user can stand in the traveling direction with one boot on each of the standing plates. By loading the one standing plate and relieving the other standing plate, an offset in height of the standing plates with respect to each other is achieved and consequently—transmitted to the skates—an edging movement of the skates, their sliding surfaces continuing to lie parallel to each other, but becoming offset with respect to each in the longitudinal direction and additionally no longer lying in one plane but in spaced-apart parallel planes with respect to each other.

Another solution according to the invention manages with only one standing plate, irrespective of the number of skates. Use is then similar to a conventional snowboard with regard to securing and positioning of the user, but the force necessary for the edging of the winter sports device is much less and the edging can also be initiated much more smoothly. Altogether, this produces much better traveling characteristics.

The traveling characteristics are positively influenced in particular if when edging the winter sports device the standing plate of the winter sports device is further removed from the slope than the uphill ski, so that the loading is stronger on the downhill ski.

For this reason, it is disadvantageous to secure this single standing plate directly centrally to the crossbars to be connected. This is so since an edging movement would then result in a swiveling of the crossbar about the central swiveling axis with respect to the standing plate, as a result of which the center point of the standing plate would be shifted from the center of the winter sports device in the direction of the downhill ski. Similarly, a simple attaching of the standing plate above the crossbar is disadvantageous, since the distance between standing plate and skates in the normal position becomes very great as a result. However, a lowest possible standing point of the user is aimed for, in order to improve the traveling characteristics and the center of gravity.

For this reason, the standing plate is situated lower than the upper edge of the crossbars, that is to say for example in the case of two crossbars one securement between the crossbars at a lower level, or in the case of only one crossbar an offset standing plate, so that there is space for a foot of the user both to the left and to the right of the crossbar, that is to say in front of and behind it when seen in the traveling direction.

In order to permit a movement of the standing plate toward the downhill skate during this edging, the standing plate is secured to the connecting members, that is to say the crossbars, such that during edging there takes place, as viewed in the direction of the traveling object, a swiveling movement between standing plate and crossbar which does not take place about a fixed point, central with respect to the crossbar, but about at least two different swiveling points or swiveling points changing owing to the edging movement, which lie away from the center of the swiveling bar.

A particularly simple technical solution is obtained if the crossbars comprise, at least in the region of their prongs, a closed hollow profile and the swiveling axes of the crossbar with respect to the skates on the one hand and the swiveling levers on the other hand are realized with the assistance of disks which are relatively large in comparison with their axial and length and fit into the hollow profile of the crossbar or can be mounted in the latter.

BRIEF DESCRIPTION OF THE DRAWINGS

Two embodiments according to the invention are described in more detail below by way of example.

DETAILED DESCRIPTION OF THE EMBODIMENTS OF THE INVENTION

Figure 1:
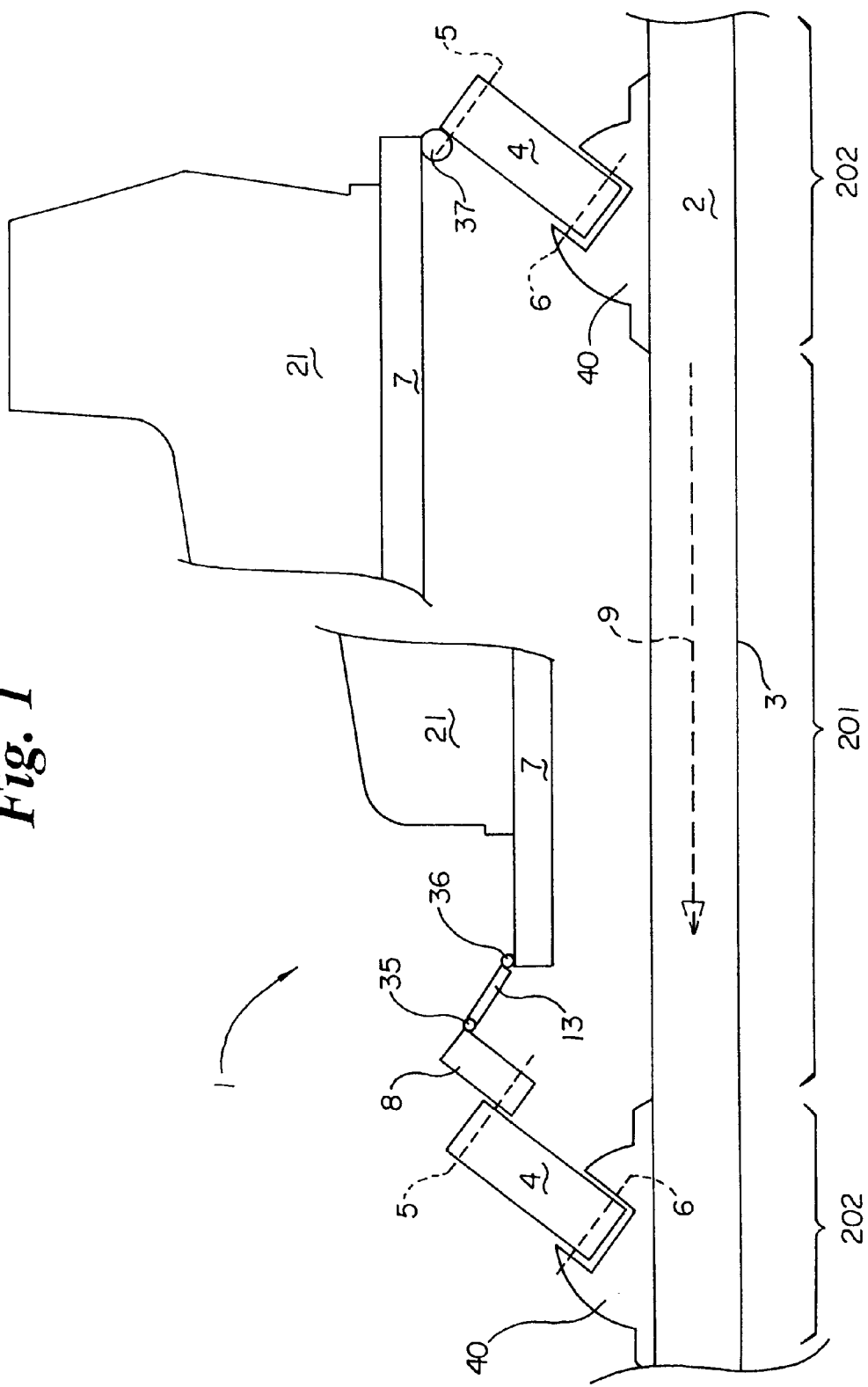
FIG. 1 shows a side view of the variants having two crossbars and two standing plates.
Figure 2:
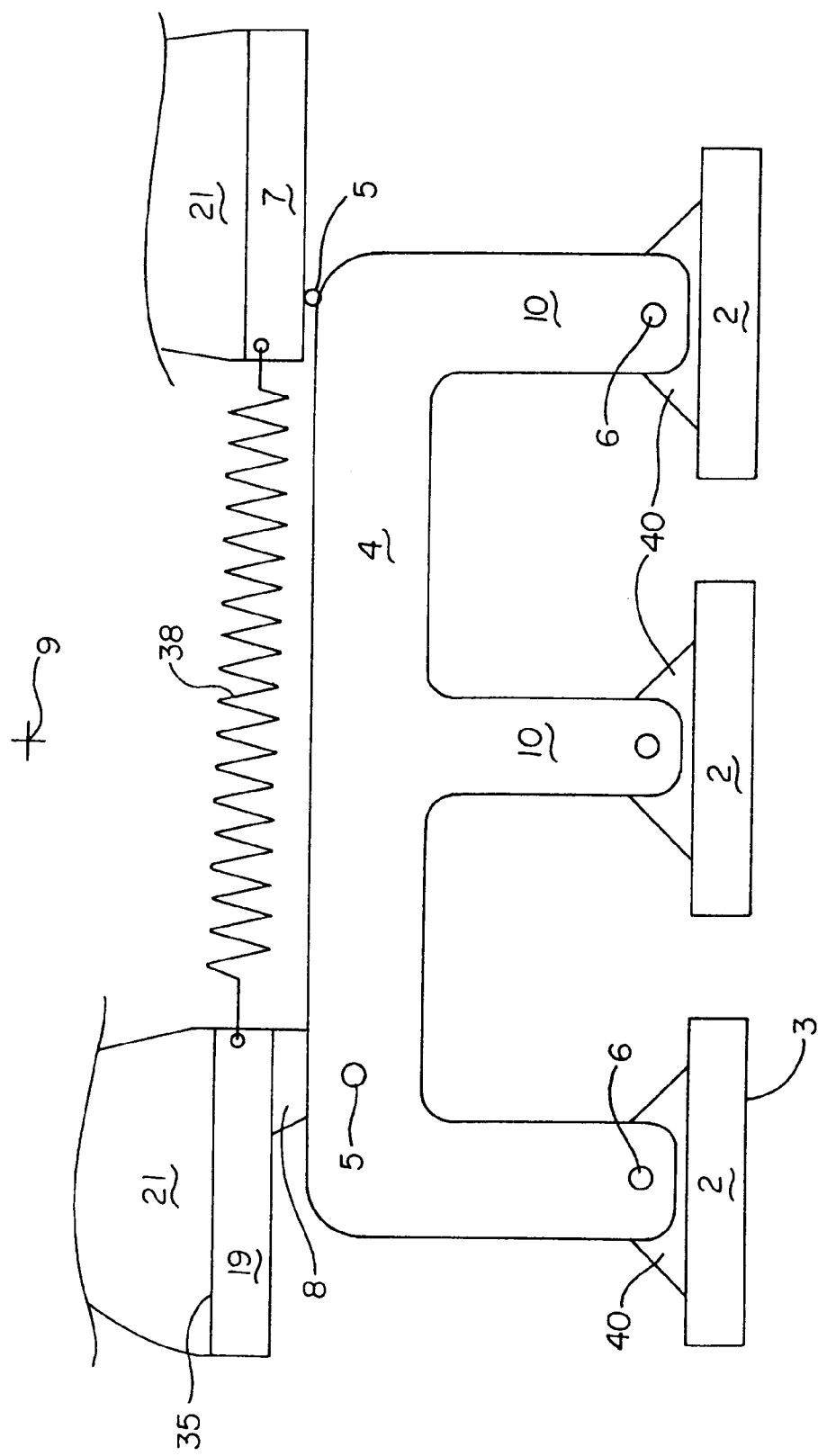
FIG. 2 shows a view of the solution of FIG. 1 in the traveling direction with neutral central position.

FIG. 1 shows a solution in side view, in which the user stands with his boots (21) in the longitudinal direction on separate standing plate (7) which are arranged in parallel and are connected by means of two crossbars (4) to the, in this case, three skates (2) as can be seen better in the frontal view of FIG. 2, which shows the non-edged, neutral central position. In FIG. 2, two different embodiments of the connection of the standing plate (7) or of the swiveling lever (8) to the crossbars (4) are represented on the left side and right side.

In this case, the skate 2 is intended to be able, in particular in this central lengthwise region 201, that is to say in the region between the bearing blocks 40 for the crossbars 4, the flex in the upward and downward directions, corresponding to the vertical loads occurring and the form of the underlying surface.

In this case, with vertical pressure on the tip of one skate from below in the upward direction, a flexing of the skate can also take place in the central region 201 in the downward direction, for which reason the skates have to be designed to be more rigid in the regions 202 of the securing of the bearing blocks 40 than in the central region 201. At the same time it must be possible to permit a slight turning of the bearing blocks 40, and consequently of the crossbars 4, about an axis running perpendicularly with respect to the plane of the drawing of FIG. 1. With corresponding flexing of the skate, this is possible if either the standing plate 7 is connected jointedly and by means of a length compensation—as represented in FIG. 1—to the crossbars 4 or, instead of this, the securing of the bearing blocks 40 to the skates 2 allows a slight swiveling about an axis running perpendicularly with respect to the plane of the drawing.

Figure 3:
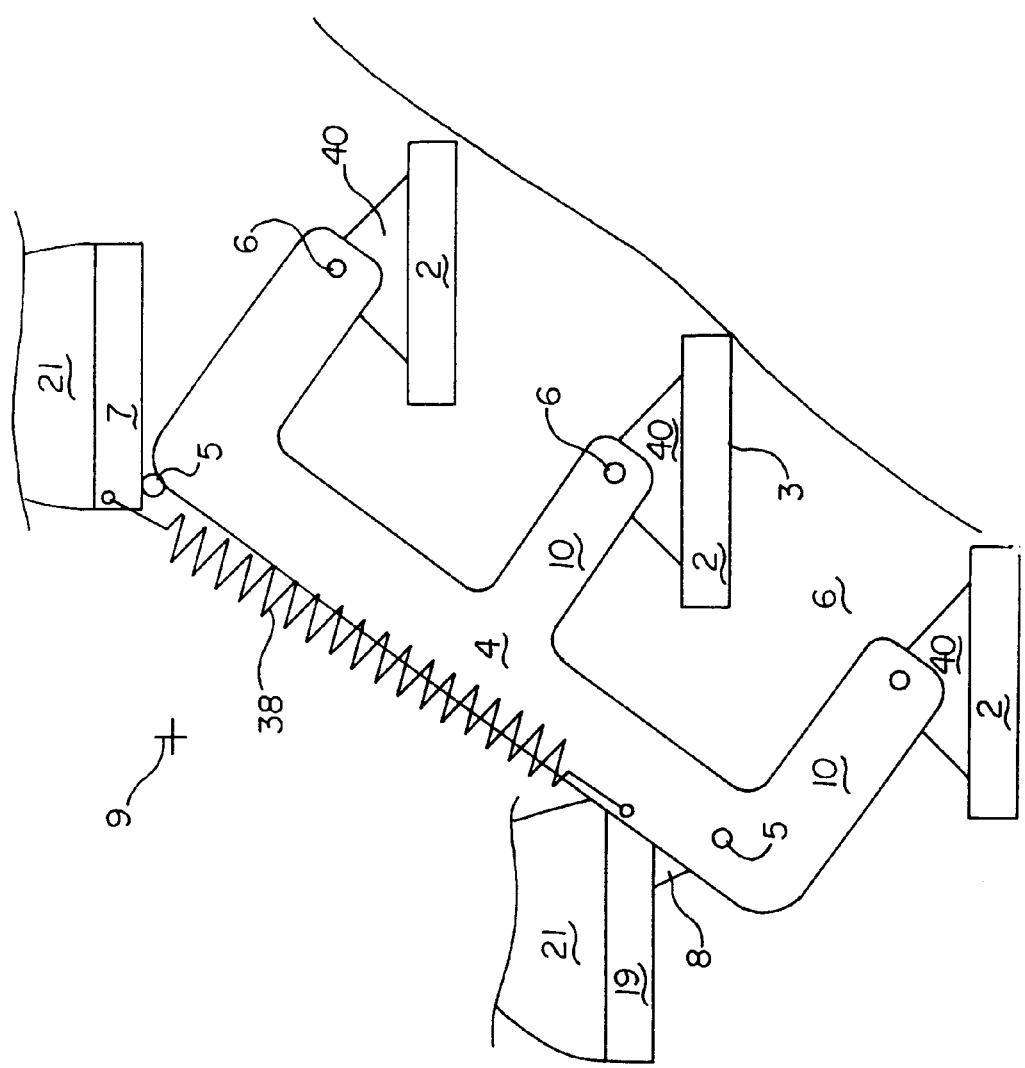
FIG. 3 shows an edged position in comparison with FIG. 2.

The aim is always to effect by a deflecting of the standing plate (7) or of the swiveling lever (8) from the horizontal central position, so-called edging, also a corresponding edging of the skates (2), in order to achieve good edge grip of the skates (2) on a slope, as represented in FIG. 3.

This is achieved by, on the one hand, the skates (2) being jointedly connected to the crossbars (4) and, on the other hand, by the crossbars (4) being jointedly connected to the standing plate (7) or the swiveling lever (8), that is to say indirectly to the boot (21), the swiveling axis (5, 6) of these joints not lying parallel with respect to the longitudinal axis (9) but at an angle thereto.

As can be seen in FIGS. 1–3, the crossbars (4) are arranged with the free ends of their prongs (10) directed obliquely forward and downward, the free ends of the prongs (10) being mounted about the obliquely upwardly rising, straight-ahead swiveling axis (6), respectively in a bearing block (40) of one skate (2) each. The connecting crossleg of the crossbar (4) is connected to the next component by means of swiveling axes (5) running parallel with respect to the swiveling axis (6).

As can be seen in FIG. 1, in the front part, this may be a swiveling lever (8), as also represented in FIG. 2 in the left half of the figure, which has a horizontal leg (19) in order to secure therein a boot (21) a binding element or the like, for example by means of a hinge (35) with a horizontal hinge axis.

As represented in FIG. 1, a continuous standing plate (7) is secured there between the swiveling lever (8) of the front crossbar (4) and the rear crossbar (4) by means of hinges (35, 36, and 37) with horizontal hinge axes, on which plate the boot (21) can be arranged fixedly or simply standing thereupon. Between the swiveling lever (8) of the front crossbar (4) and the front end of the standing plate (7) there is additionally arranged in this case as length compensation an intermediate lever (13) which, by changing its oblique positioning by means of the hinges (35, 36) arranged on each side, in spite of the length of the standing plate (7) remaining constant, compensates for a changing distance between the rear hinge (37) and the front hinge (35), which is caused by it being possible when traveling for there to be a flexing of the skate (2) underneath the standing plate (7), and due to this connection the linear distance between these two points also changes.

Figure 11:
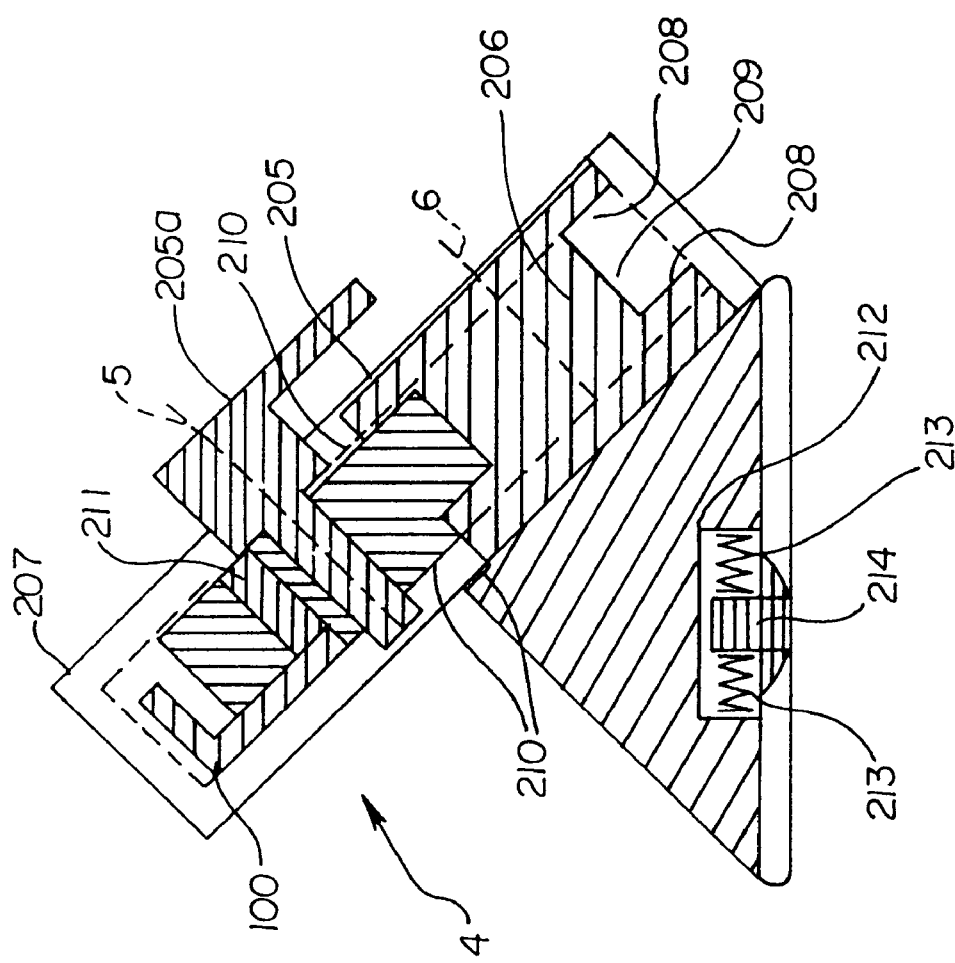
FIG. 11 shows a side view of the solution of FIG. 10.

Instead of the intermediate lever 13, the length compensation can also be performed by at least one of the two bearing blocks 40 being secured displaceably in the longitudinal direction on the skate 2, as represented better in detail in FIG. 11.

In FIG. 2, in contrast to the left hand of the figure, it is represented in the right half of the figure that, given length compensation and the voidance of mutual component hindrance, the standing plate (7) can also be articulated directly by means of the upper swiveling axis (5) on the crossbar (4).

In the representation according to FIGS. 2 and 3, the swiveling lever (8) and the standing plate 7 of the two sides are held in the neutral central position by a tension spring (38) arranged in between, which is articulated on these two components, in the viewing direction of FIG. 2, at points which are located to an adequate extent within the swiveling axis (5) of these components.

When deflecting for edging, as represented in FIG. 3, as a result the distance between the articulation points is increased, so that the more highly stressed tension spring (38) has the tendency to draw the standing plates (7) or swiveling levers (8) back into their neutral central position.

Figure 8:
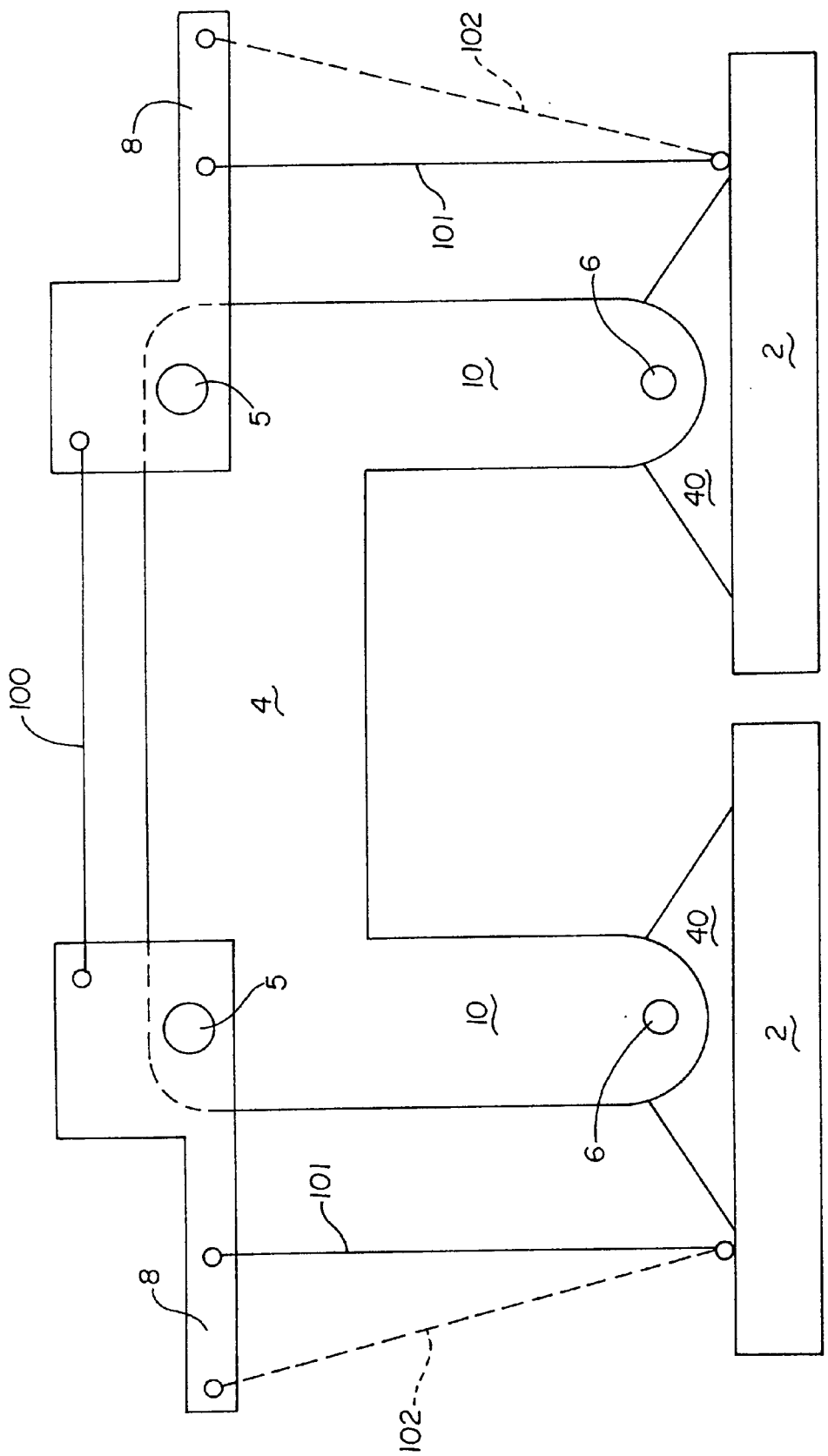
FIG. 8 shows a representation according to FIG. 4 with another solution.

Instead of by two crossbars (4) spaced apart in the longitudinal direction, it is possible for all of these basic solutions also to be realized by only single crossbar (4), as the solution represented in plan view according to FIG. 8 shows: in this case the crossbar (140), H-shaped in plan view, is designed such that, starting from a central plate which extends transversely over the skates (2), in front region and rear region the prongs (10) extend downward to the bearing blocks (40) of the skates (2). For reasons of saving material and weight, the central plate is in this case designed to be relatively short, so that the prongs (10) are located at continuous extending forward and rearward from the central plate and running in the longitudinal direction.

Figure 5:
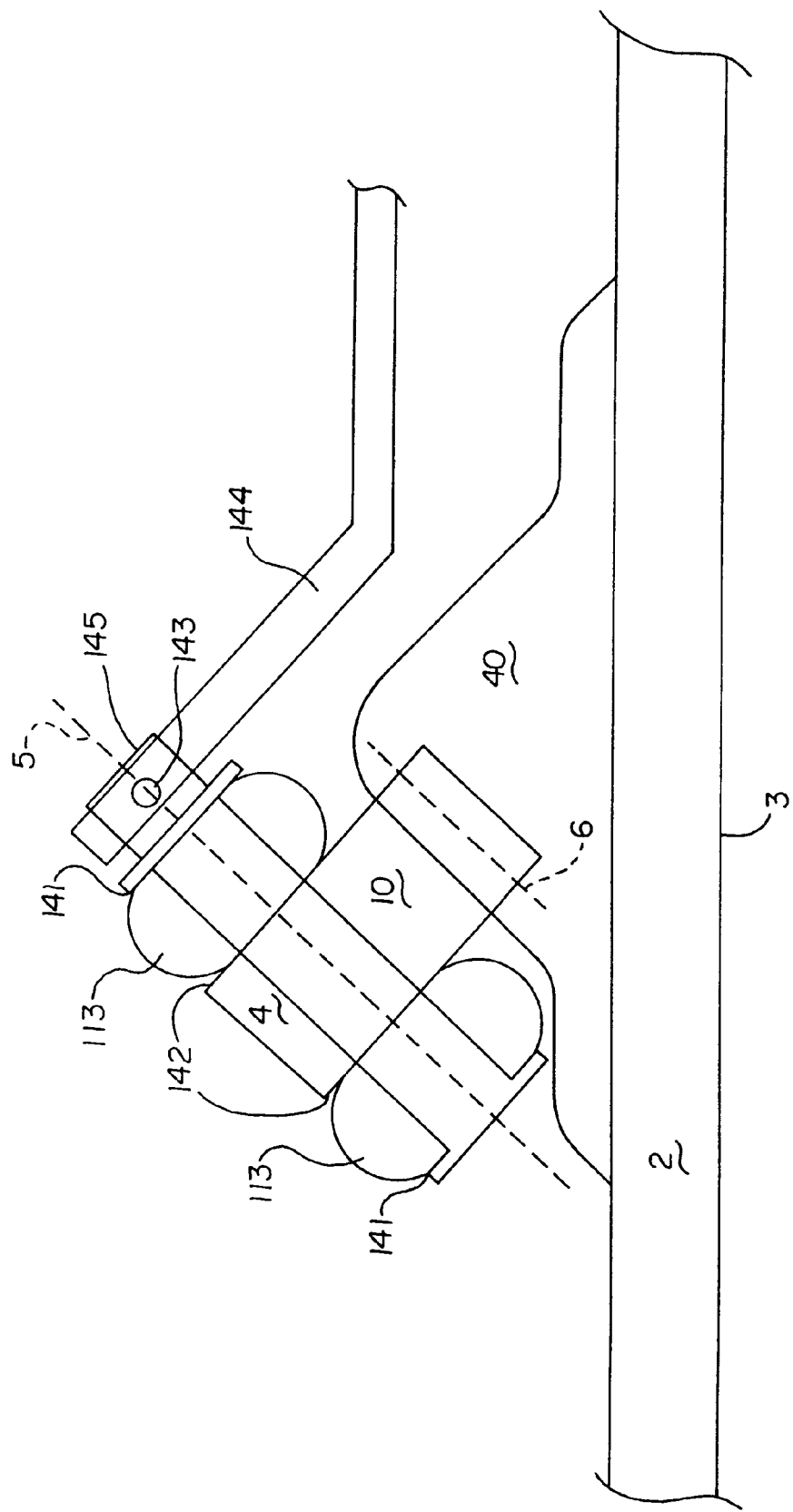
FIG. 5 shows a detailed view of a compensating element.

In FIG. 5 there is also represented a detailed solution in which, instead of the intermediate lever (13), the length compensation is achieved directly by the structural design of the upper swiveling axis (5); while the crossbar (4) is mounted in the way described above by means of oblique swiveling axes (6) at its lower free ends in the bearing blocks (40) of the skates (2), the upper swiveling axes (5) are realized by bolts (145), which pass parallel with respect to the lower swiveling axis (6) through the crossbar (4). The free end of the bolt (145) is in this case located in an elongate hole or slot in the free end of an end piece (144), which may be for example, part of the standing plate (7) and runs substantially parallel to the direction of the prongs (10) of the crossbar (4). The end piece (144) is connected in a rotationally fixed manner by means of a cross pin (143) to the bolt (145) and can additionally move back and forth along the longitudinal direction of the latter on account of the design as a slot or elongate hole, as a result of which the length compensation is accomplished. In additional, the length compensation is facilitated by the bolt (145) which realizes the upper swiveling axis (5) not bearing with its corresponding shoulders (141) directly against the end faces (142) of the crossbar (4), but instead by means of annular rubber buffers (113) which are arranged in between and can be compressed in the direction of the bolt (145), and as result likewise allow a length compensation.

Figure 6:
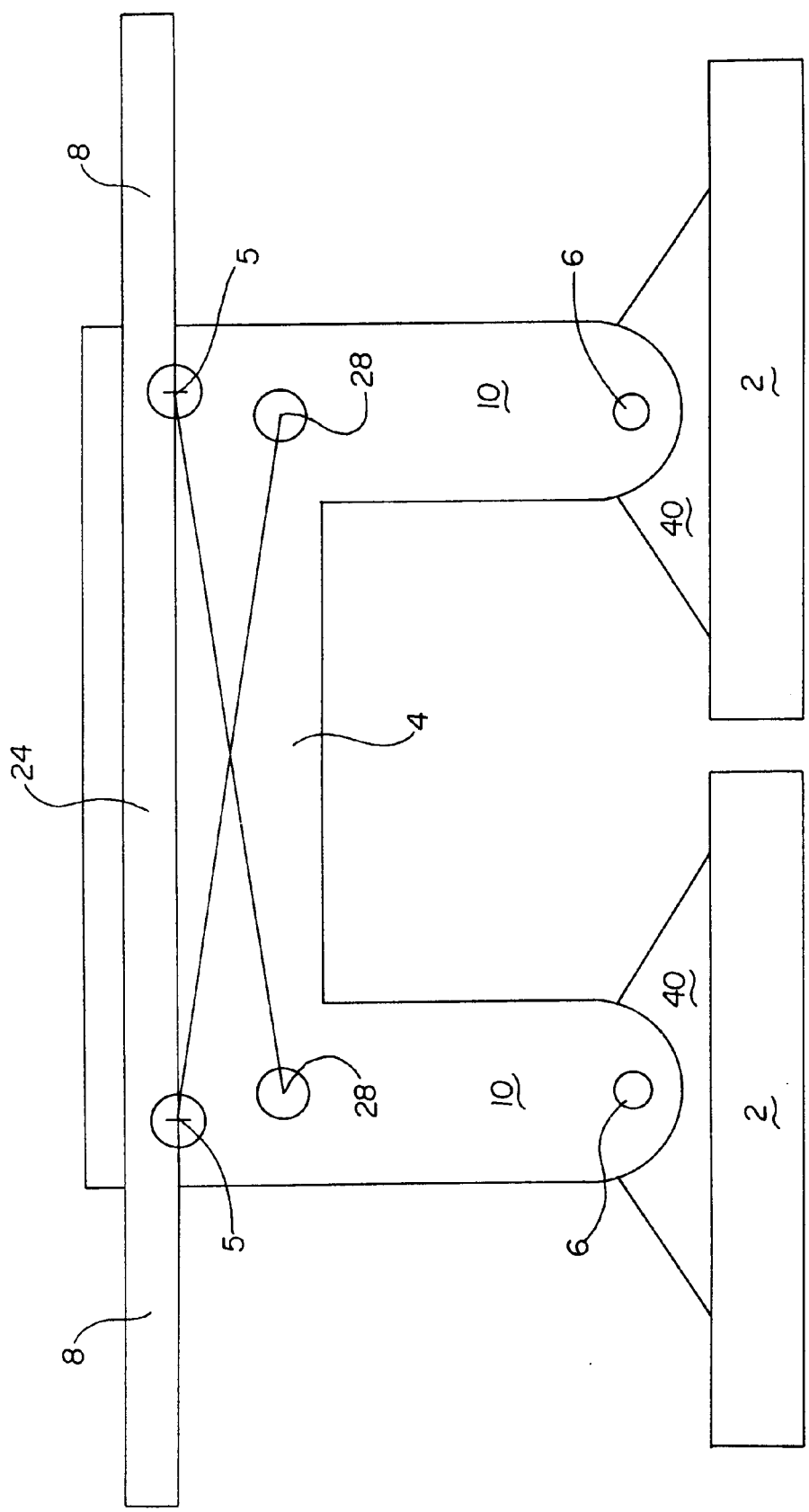
FIG. 6 shows a frontal view of a solution in neutral position.
Figure 7:
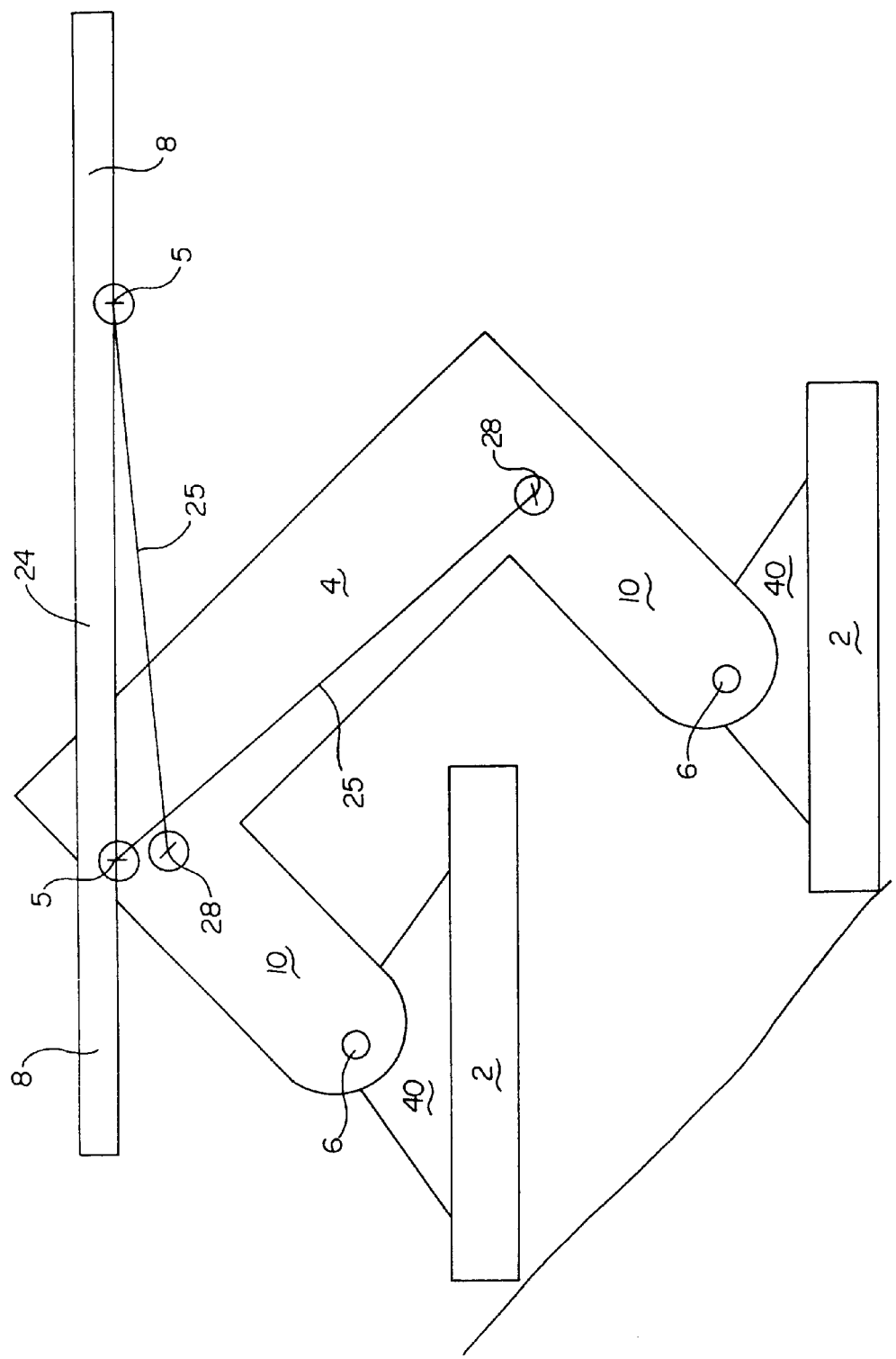
FIG. 7 shows a representation according to FIG. 6 with another solution.

A further solution for just a single, uniform standing plate or binding etc., but with a simple structural solution, is shown by FIGS. 6 and 7:

There—in the case of a winter sports device (1) having only two skates (2) and accordingly also only two prongs (10) at each crossbar (4)—the two swiveling levers (8) are firmly interconnected by an intermediate piece, forming a uniform standing plate or a securing element for a binding etc.

This standing plate is in turn jointedly connected by means of intermediate levers (25) to the crossbar (4), these intermediate levers (25) running across each other and being respectively connected on the one hand to the standing plate and on the other hand to the angle lever.

A further solution is shown in FIG. 8, which shows the classified parallelogram articulation: there, the individual swiveling levers (8) are in each case separately articulated jointedly on the crossbar (4) relatively far to the outside. In addition, these swiveling levers (8) are connected by means of levers (101) articulated eccentrically of the swiveling axis with respect to the crossbars (4) to the skates (2), on which the lever (101) likewise acts in turn away from the swiveling axis (6) between crossbar (4) and skate (2).

If the lever arm of the swiveling axis (5) of the swiveling lever (8) is larger than the lever arm of the swiveling axis (6) of the skate (2), this also results in progressive edging. In order to ensure a uniform edging movement of the two skates (2), and consequently also of the two swiveling levers (8), there is additionally between the two swiveling levers (8) a lever (100), which likewise acts in turn away from the swiveling axes (5), of the swiveling levers (8), with the same lever arm.

The levers 100, 101, 102 are absolutely necessary if the swiveling axes 5 and 6 run parallel with respect to the skates, that is to say horizontally.

If, however, the swiveling axes 5, 6 are inclined at an angle with respect to the plane of the skates 2, the additional levers 100, 101 and 102 are not absolutely necessary, but can facilitate the force transmission from the swiveling levers 8, and consequently the standing plate 7, of the user to the skates 2 and vice versa.

Figure 10:
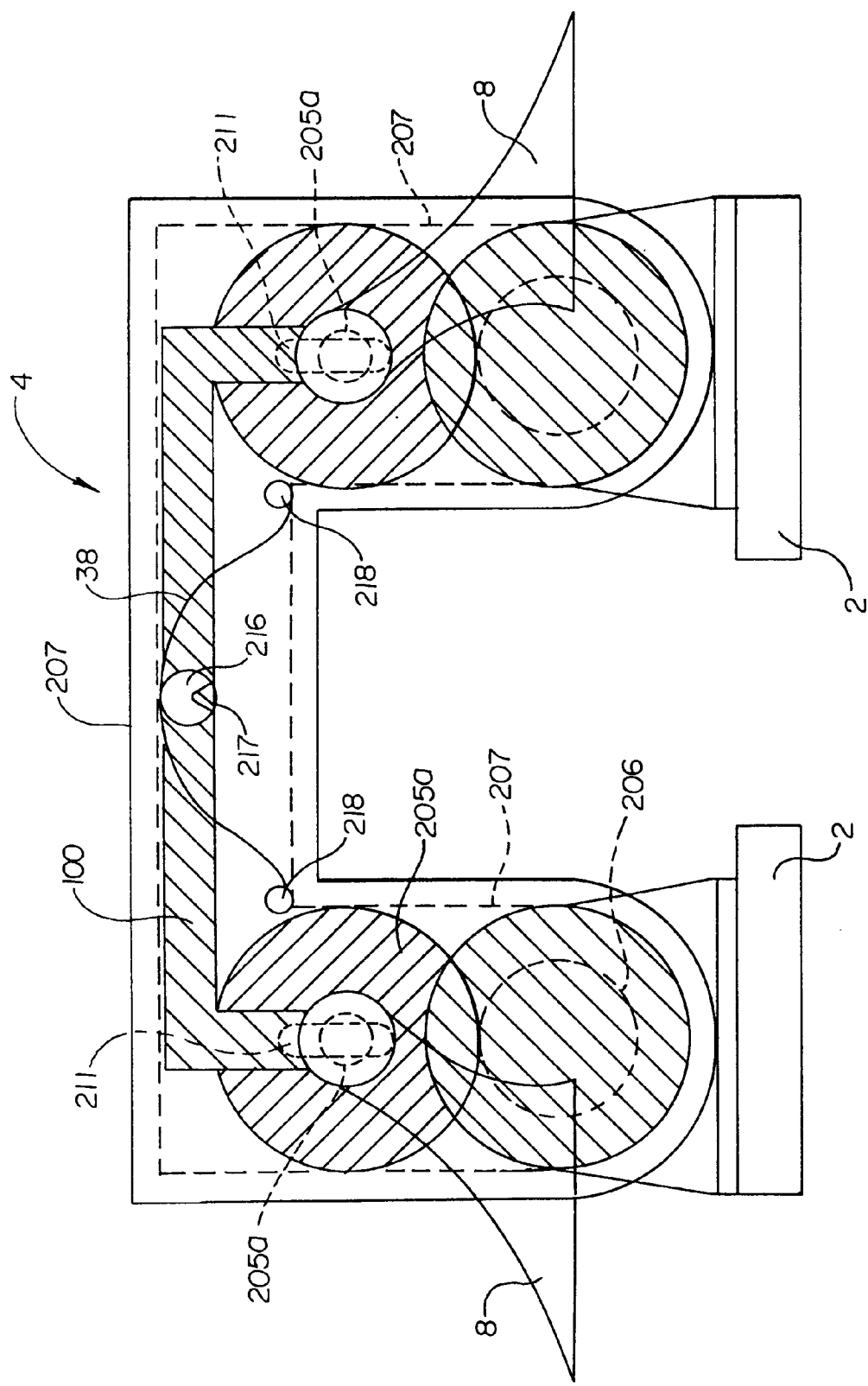
FIG. 10 shows a practical solution similar to the basic representation of FIG. 8.

In this sense, in FIGS. 10 and 11 there is a structural embodiment of a solution in which—as evident in the side view of a connecting unit in FIG. 11—the swiveling axes 5 and 6 are inclined at an angle with respect to the horizontal, that is to say the plane of the skates.

Nevertheless, the two swiveling levers 8—as can seen in the frontal view of FIG. 10—are operatively interconnected by means of a lever 100. This solution is distinguished by being simple to assemble and by the possibility of using materials which cannot absorb very high surface pressures:

The bar 4 comprises a hollow, closed profile 207, which is open on the upper side of FIG. 10 and consequently the inner space is accessible.

It can be seen in FIG. 11 that there is connected in a rotationally fixed manner to the oblique bearing block 40 a relatively large disk 206, which represents the axial bolt for the lower swiveling axis 6.

The disk 206 is provided in the manner of a spool with a larger outside circumference on its end faces, by means of which it is mounted in corresponding bores of the housing 207 of the bar 4. For this purpose, during assembly, the bar 4 is pushed onto the disk 206 in the axial direction, that is to say from the top right in FIG. 11 and is secured there. Approximately in the center of its axial length, the disk 206 has a section of reduced diameter due to a groove 209.

The upper swiveling axis 5 is formed by the rotationally fixed connection of the disk 205 to the axially projecting axial bolts 205a inserted centrally therein. Axial bolts 205a are mounted by their projection radially in the profile 207 of the crossbar 4. The disk 205 is located in the inner space of the profile 207 and fills the latter to the greatest extent both in the axial direction and in the diametrical direction.

The disk 205 in this case also engages in the groove 209 of the neighboring, parallel-guided disk 206 and fills this groove 207 substantially completely from one side wall 208 to the other.

As a result, upon radial loading of the axial bolt 205a and its consequent shifting with respect to the theoretical swiveling axis 5, not only does there take place a surface pressure between the axial bolt 205a and the hollow profile 207 carrying it, which on account of the small contact surfaces results in relatively high surface pressures. Rather, at the same time the disk 205 firmly connected to the axial bolt 205a is supported by its bordering end faces both on the inner surfaces of the hollow profile 207 and on the respective side wall 208 of the groove 209 of the neighboring disk 206.

On account of the greater enlargement of the contact surfaces and the favorable, large lever arms in the support on account of the large diameter of the disk 5, there is consequently altogether a relatively low surface pressure between the parts bearing against one another.

In comparison, the sliding friction occurring between the end faces or circumferential surfaces of the disk 5 and the hollow profile 207 or the disk 206 is negligible.

On the axial bolts 205a there are likewise secured in a rotationally fixed manner the swiveling levers 8, which can be seen in FIG. 10.

Consequently, by the lever 100, which interconnects the two disks 205, the two swiveling levers 8 are also operatively interconnected.

The lever 100 which in the assembled state is likewise located completely within the hollow crossbar 4, is double-cranked in the plane of the crossbar, in analogy with the latter, and is operatively connected to disks 205 by means of in each case a joint bolt 211, which is connected to the lever 100 and engages in a corresponding eccentrically arranged bore in said disks 205.

On account of the oblique swiveling axes 5, 6 it is important that the distance between the joint bolts 211 is equal to the distance between the two swiveling axes 5.

By means of the connecting lever 100, the edging movement of the one swiveling lever 8 is additionally transmitted purely mechanically to the other swiveling lever 8 for positive guidance by the oblique positioning of the swiveling axes 5 and 6. Furthermore, by arrangement of a spring 38 between the lever 100 and the housing 207 of the crossbar 4, a restoring of the entire mechanism into the neutral central position is effected on account of the biasing which can preferably be set. For this purpose, the spring 38 is wrapped around a projection 216, which protrudes approximately in the center from the lever 100 and is connected in a rotationally fixed manner to said projection 216 by means of a nose 217 at a place on the circumference of said projection 216.

The spring 38, braced by the projection 216, is supported by its free ends against corresponding stops 218 in the inside of the hollow profile 207. As a result, upon movement of the lever 100 in the direction toward one of the stops 118, this part of the spring 38 is deformed to a disproportionate extent and is under grater biasing, which brings about the restoring into the neutral central position.

Furthermore, the longitudinal displacability of the bearing block 40 with respect to the skate 2 is represented in FIG. 11: a nose 214 of the skate protrudes from below into a longitudinal groove 212 of the bearing block. On each side of the nose 240 there are inserted into the end pieces of the groove compression springs 213, which bring about a restoring of the change in length into an envisaged central position when the loading of the sports device is ended. The bearing blocks 40 for the swiveling axis 6 are in this case generally situated on the longitudinal center of the individual skates 2.

Figure 4:
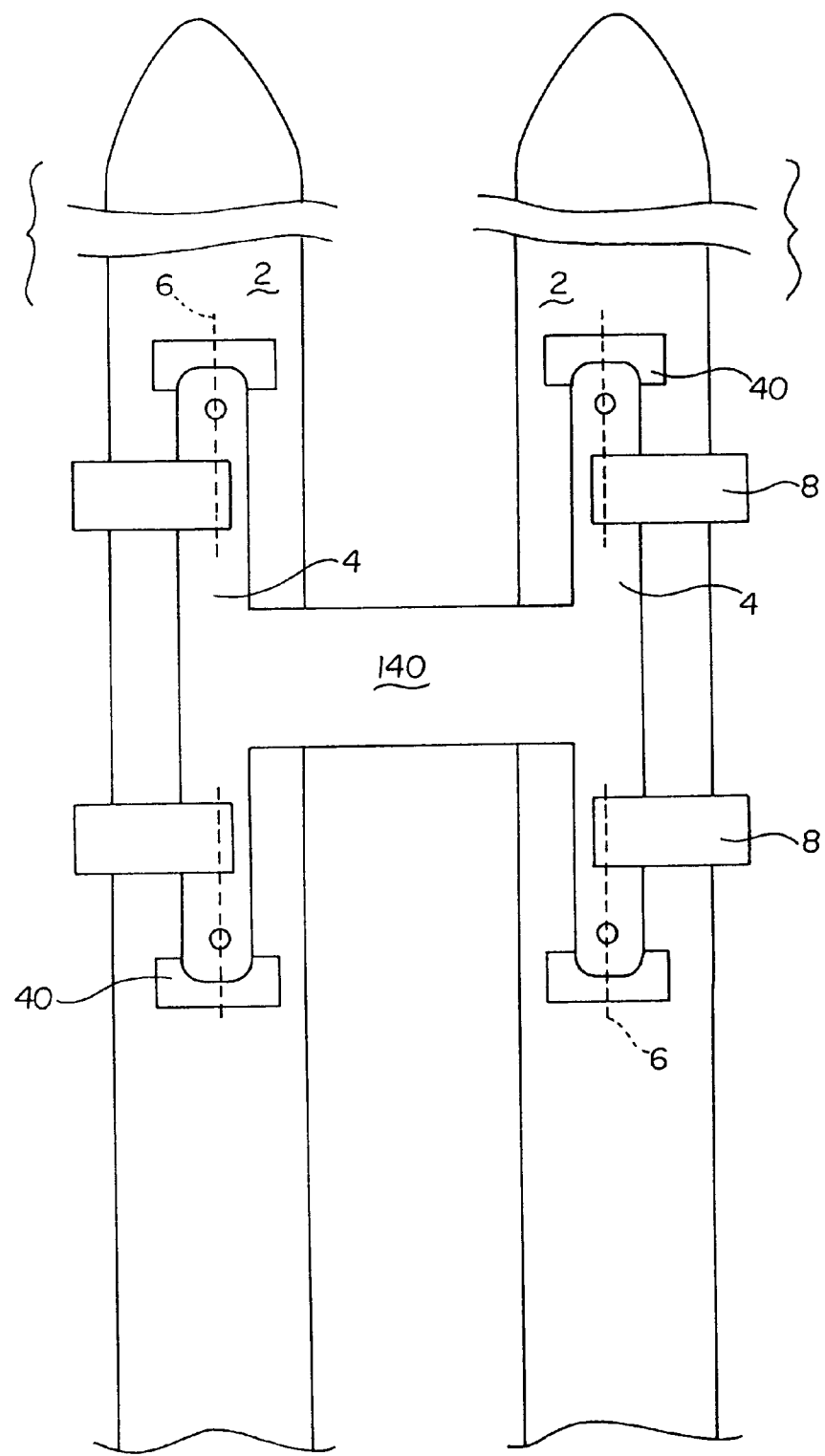
FIG. 4 shows a plan view of a winter sports device having only one crossbar.
Figure 9:
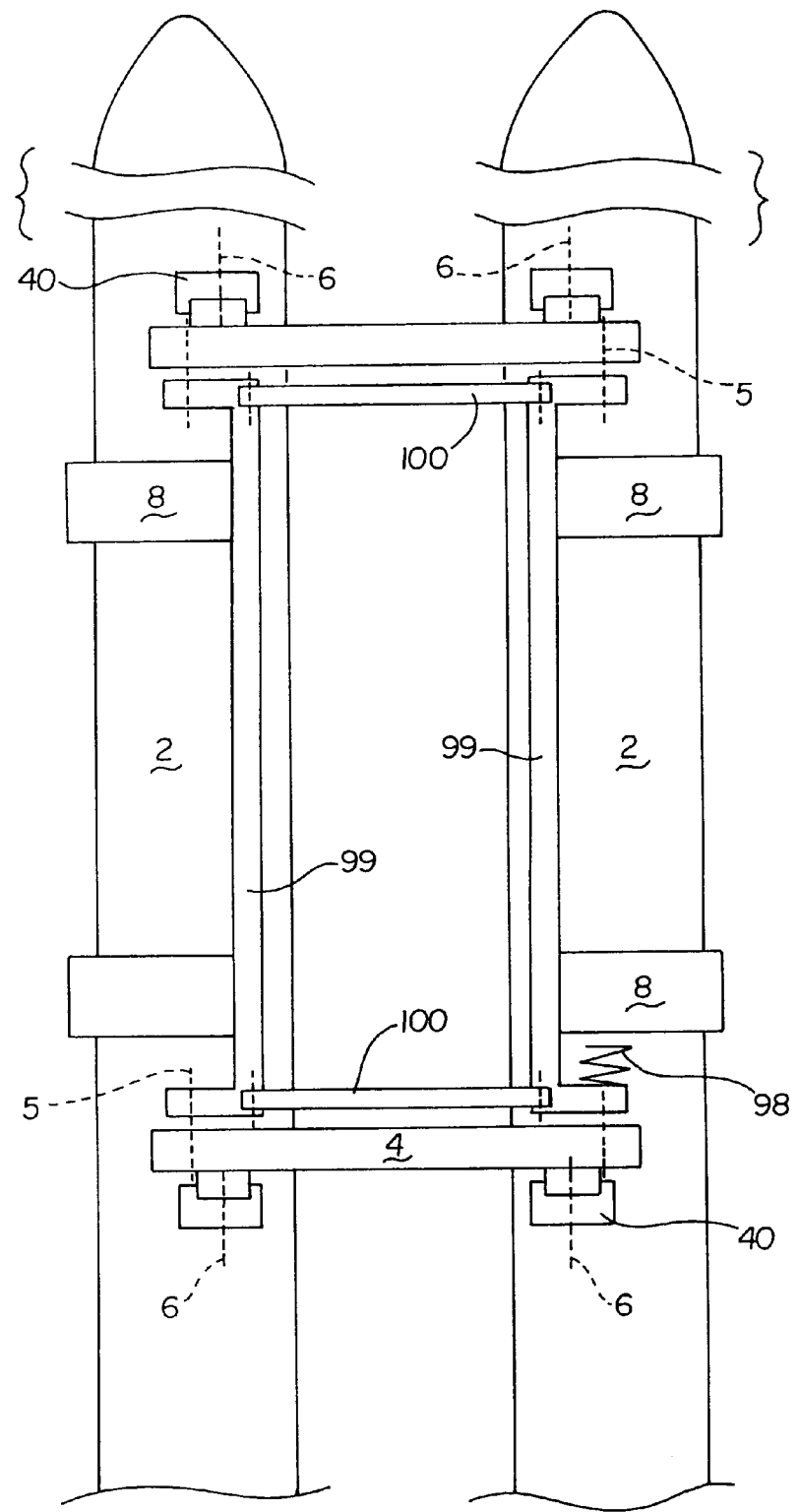
FIG. 9 shows a representation according to FIG. 4 with another solution.

Another solution with respect to the "H solution" of FIG. 4 is shown by FIG. 9.

There, only the two swiveling levers 8 of one side are respectively interconnected rigidly to each other in a rotationally fixed manner by means of a longitudinal connection (99), for example a square tube.

The resulting left and right swiveling-lever units are coupled to each other by means of a front and rear lever each (100), which act jointedly on the swiveling-lever units above or below the upper swiveling axis 5.

As represented, around the bolt which realizes the upper swiveling axis (5) there is a torsion spring (98), in the form of a spiral spring, for restoring into the neutral potion.

In order to ensure uniform force introduction, this equipment is recommendable at all the upper swiveling axes (5) and/or also at all the lower swiveling axes (6).

Figure 12:
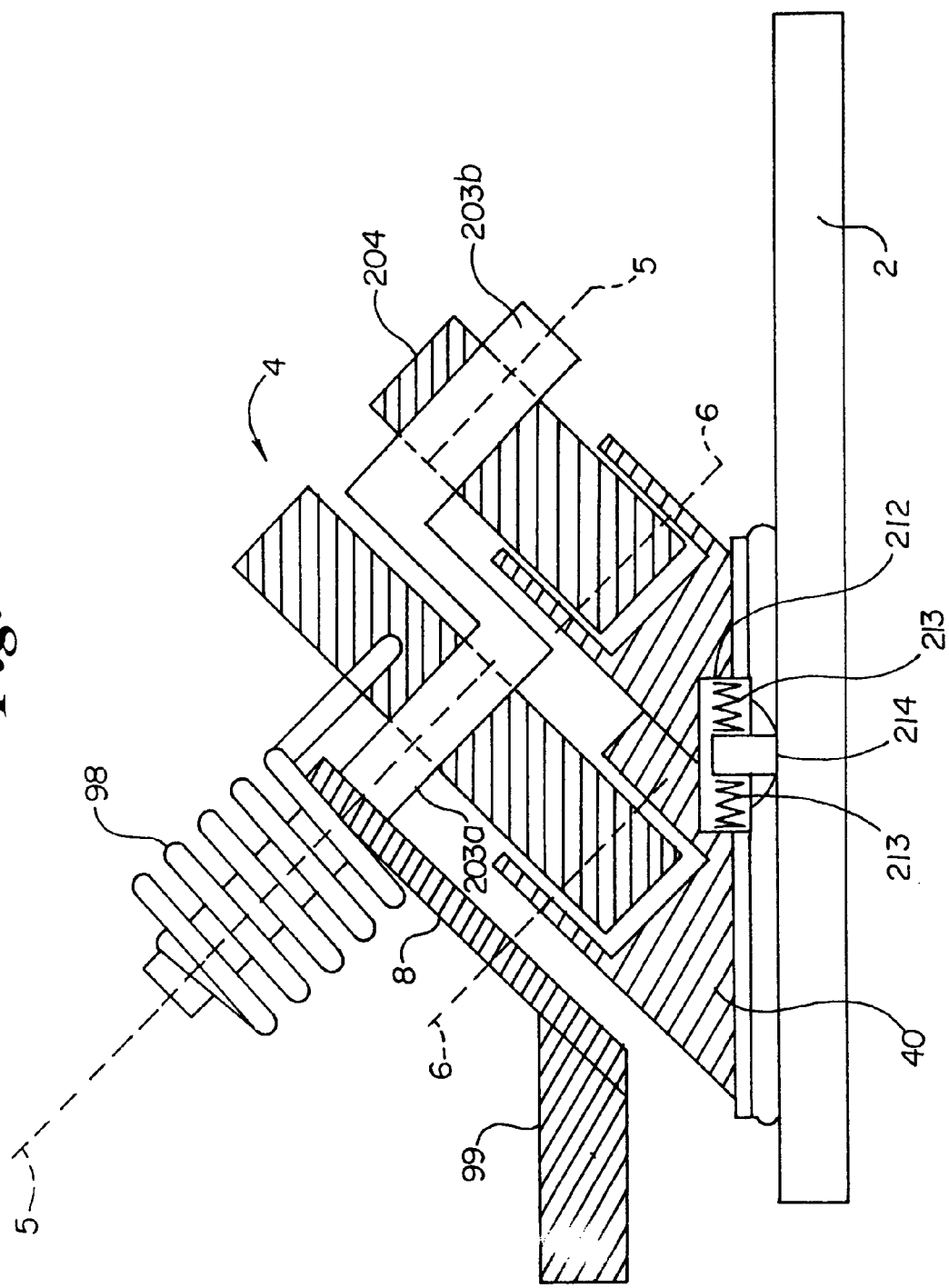
FIG. 12 shows an embodiment of a design with respect to the basic representation of FIG. 9 in side view and FIG. 13 shows a perspective basic representation as a modification of FIG. 12.

A structural embodiment of a connecting unit, designed on the basic principle of FIG. 9, is shown by FIG. 12 in side view.

In this case, however, the edging movement is additionally also transmitted mechanically for the oblique positioning of the swiveling axes 5, 6 with respect to the plane of the skates 2.

Figure 13:
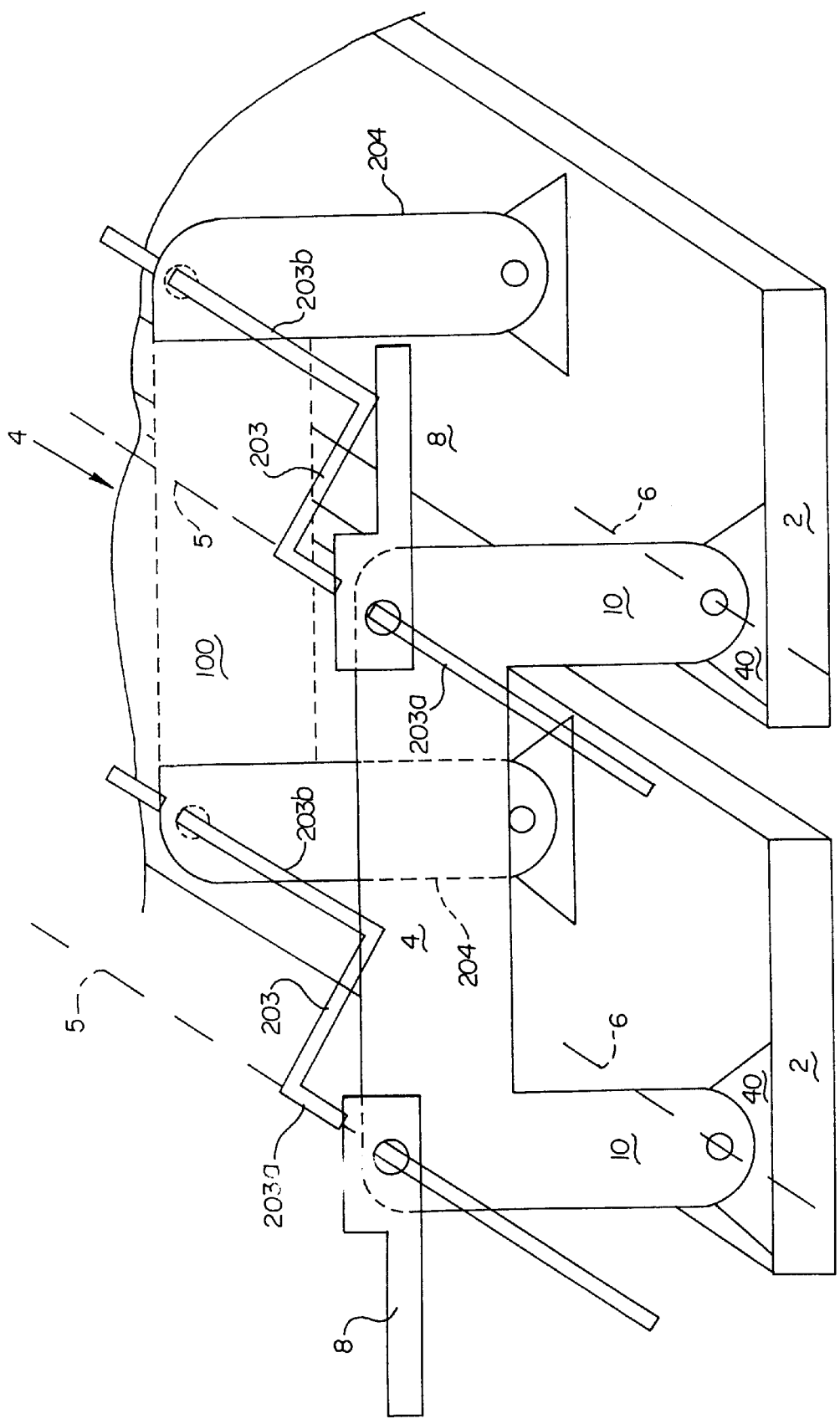

As can be seen better in the basic representation of FIG. 13 for this purpose the bearing pin 203a, which represents the upper swiveling axis 5 between the crossbar 4 and the swiveling levers 8, is lengthened to give a cranked— preferably altogether one piece shaft 203 with a second bearing pin 203b which is offset radially with respect to the first bearing pin 203a and ends in the free end of a lever 204, which is connected to the skate 2.

In this case, the prongs of the crossbar 4 are arranged not centrally, but eccentrically of the longitudinal center of the skates 2 and the additional levers 204 likewise, but on the opposite side of the longitudinal center from the securing of the crossbars 4.

In this case, the individual levers 204 may also be supplemented by means of a transversely running yoke in the sense of the lever 100 to give a second crossbar 4', identical to the crossbar 4.

A solution for this structural design is represented in side view in FIG. 12.

In this case there can be seen the cranked shaft 203, which is mounted at its one bearing pin 203a as the upper swiveling axis 5 in the crossbar. The crossbar 4 is mounted at its lower free ends in such a way that is can swivel about the swiveling axis 6 by means of a bearing bolt 215 in the bearing block 40, the swiveling axes 5 and 6 running in the longitudinal direction parallel with respect to each other, but at an angle with respect to the horizontal.

Connected in a rotationally fixed manner to the bearing pin 203a is the swiveling lever 8, to which the longitudinal connection 99 or the standing plate is secured.

Furthermore, corresponding to the representation of FIG. 9 there is concentrically arranged around the upper swiveling axis 5, and consequently the bearing pin 203a, a torsion spring 98, which is connected on the one hand to the bearing pin 203a and on the other hand to the cross member 4 and, on account of its biasing which preferably can be set effects the restoring of the device into a rest position after relief.

The second bearing pin 203b is secured in a corresponding bore of in each case one lever 204, which protrudes parable to the crossbar 4 from a common bearing block 40 and is mounted on the latter about a bearing bolt 215 corresponding to the lower swiveling axis.

In FIG. 12 it can also be seen that the complete bearing block 40 is firmly connected not over its entire surface, but only in its center to the skate 2 as a result of which a slight swiveling capability of the complete bearing block 40 is possible with respect to the skate 2 about an axis running perpendicularly with respect to the plane of the drawing.

Figure 14:
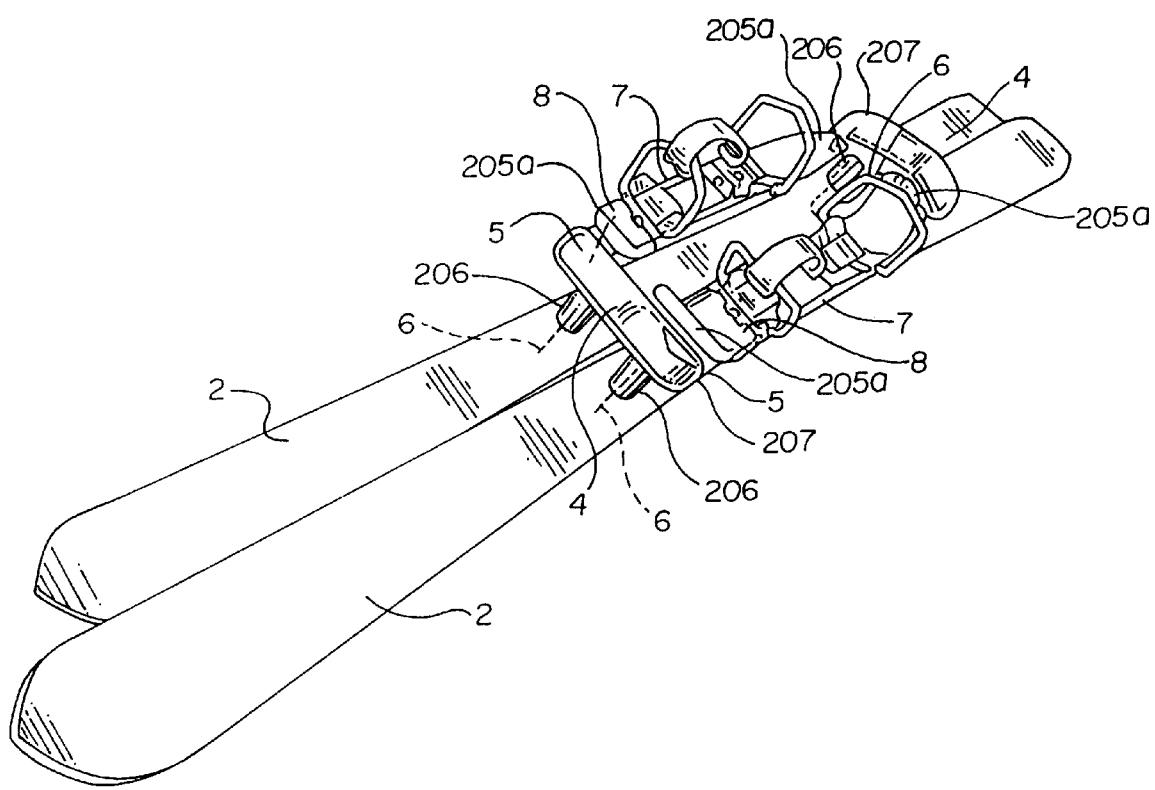
FIG. 14 shows a perspective view of the winter sports device incorporating the solution of FIGS. 10 and 11.
Figure 15:
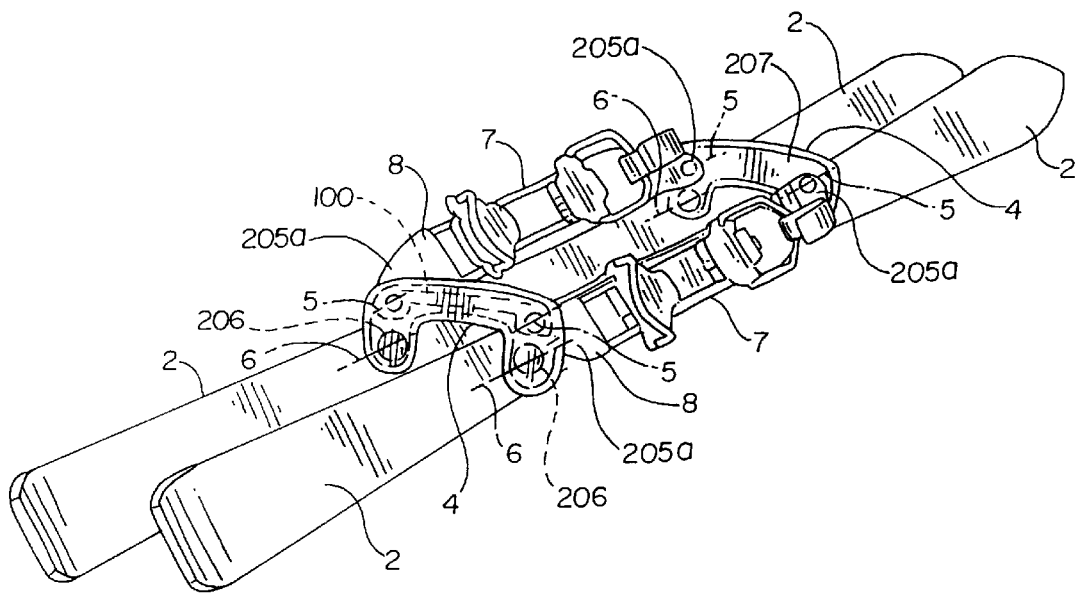
FIG. 15 shows an alternative perspective view of the winter sports device of FIG. 14.
Figure 16:
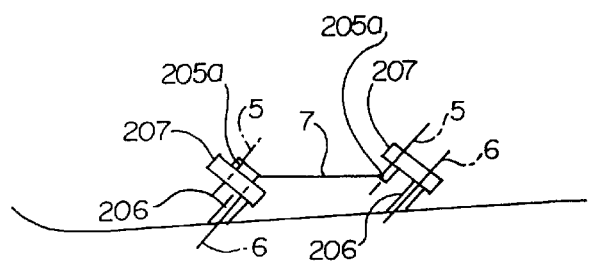
FIG. 16 shows a side functional diagram of the winter sports device of FIGS. 14 and 15.

FIGS. 14–16 illustrate the complete winter sports device incorporating the structural embodiment of FIGS. 10 and 11. FIG. 14 shows a frontal perspective view of the winter sports device, FIG. 15 shows a rearward perspective view of the winter sports device and FIG. 16 shows a side functional diagram of the winter sports device. As can be seen, the stand plates 7 are rotatably secured to the crossbars 4 via the swiveling levers 8 and the axial bolts 205a, which are arranged along swiveling axes 5. The disks 206 rotatably secure the crossbars 4 to the skates 2 and are arranged along swiveling axes 6. As mentioned above, swiveling axes 5 and 6 are inclined at an angle with respect to the horizontal plane of the skates. The illustrations of FIGS. 14 and 15 show that the arrangement of the device allows for the movement of the skates both longitudinally relative to each other and up and down relative to each other, but provides that the skates remain substantially parallel.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A sports device for sliding on an underlying surface, in particular a winter sports device (1), having:

at least two parallel skates (2) having sliding surfaces;

at least one connecting member running transversely with respect to, and jointedly interconnecting, the skates (2) such that the sliding surfaces (3) of the skates (2) lie parallel to each other, each connecting member having a prong;

a foot engaging device chosen from the group consisting of bindings, standing plates and boots;

at least one swivelling lever (8, 8') for securement of the foot engaging device on each connecting member;

each swivelling lever (8, 8') being articulated jointedly on the connecting member by means of an offset axle member for producing an eccentric swivelling axis (5), the swivelling axis (5) not lying parallel with respect to the longitudinal axis (9) of the winter sports device, but at an angle thereto, wherein on each connecting member there are arranged at least two swivelling levers (8, 8') symmetrically and eccentrically with respect to the longitudinal axis (9) of the winter sports device (1) on each side, and wherein the swivelling levers (8, 8') are arranged in plan view at least partially outside the eccentric swivelling axes (5), which represent the connection between connecting member and swivelling lever (8, 8'), in order to achieve a corresponding edging of the skates (2) by a deflecting of the swivelling lever (8) from the horizontal central position.

2. The sports device of claim 1, wherein the securement between the connecting members and the skates (2) has a limited jointedness about an axis in the plane of the skates transversely with respect to their longitudinal axis (9).

3. The sports device of claim 1, wherein both the skates (2) on the connecting members and the swivelling levers (8, 8') on the connecting members are mounted in such a way that they have a rest position and can swivel about lower and upper swivelling axes (6, 5), respectively, which are substantially parallel to each other and are arranged in a plane lying perpendicularly with respect to the sliding surfaces (3) of the skates (2), when the swivelling levers are in their rest position, and runs in the longitudinal direction, at an acute angle with respect to the sliding surfaces (3) when the swivelling levers are in their rest position.

4. The sports device of claim 1, wherein the swivelling levers (8, 8') on each side are interconnected in a parallelogram-like manner to each other additionally by levers (100) acting away from the swivelling axes (5).

5. The sports device as claimed in claim 4, wherein for the axial bolts for the swivelling axes (5, 6), upper and lower disks (205, 206) are used, the disks having an outside diameter which is greater than their axial length, and the lower disk (206) is mounted with its outside diameter in the prong (10) of the connecting member (4).

6. The sports device as claimed in claim 5, wherein the prongs (10) of the connecting bar (4) are designed as a cross-sectionally closed hollow profile (207), in which the disk (205) can be accommodated, wherein into the upper disk (205) there can be inserted in a rotationally fixed manner an axial bolt (205a) which protrudes above said disk at its end face and is mounted in the hollow profile (207) and is connected in a rotationally fixed manner to one of the swivelling levers (8), and upon radial loading of the axial bolt (205a), on account of the bearing clearance of the latter, the upper disk (205) is supported by its end faces (210) in the region of its outer circumference on the inner surfaces of the hollow profile (207) and the side walls (208) of a groove (209) in the circumferential surface of the disk (206).

7. A sports device for sliding on the underlying surface, in particular a winter sports device (1), having:

a) at least two parallel skates (2), b) which are interconnected jointedly by means of at least two connecting members running transversely with respect to the skates (2) such that the sliding surfaces (3) of the skates (2) lie parallel to each other, c) at least two swivelling levers (8, 8') for securement of at least one foot engaging device chosen from the group consisting of bindings, standing plates and boots on each connecting member, d) each swivelling lever (8, 8') having a rest position and being articulated jointedly on the connecting member by means of only one swivelling axis (5), wherein e) on each connecting member (4) there is arranged at least one of the swivelling levers (8, 8') symmetrically and eccentrically with respect to the longitudinal axis (9) of the winter sports device (1) on each side, f) the swivelling levers (8, 8') in their rest position are arranged in plan view at least partially outside the eccentric swivelling axes (5), which represent the connection between connecting member (4) and swivelling lever (8, 8'), and g) the skates (2) on the connecting members and the swivelling levers (8, 8') on the connecting members are mounted in such a way that they can swivel about lower and upper swivelling axes (6, 5), respectively, which are substantially parallel to each other and are arranged in a plane lying perpendicularly with respect to the sliding surfaces (3) of the skates (2), when the swivelling levers are in their rest position, and runs in the longitudinal direction, at an acute angle with respect to the sliding surfaces (3), when the swivelling levers are in their rest position.

8. The sports device of claim 7, wherein both the skates on the connecting members and the swivelling levers on the connecting members are mounted in such a way that they have a rest position and can swivel about lower and upper swivelling axes, respectively, which are substantially parallel to each other and are arranged in a plane lying perpendicularly with respect to the sliding surfaces of the skates, when the swivelling levers are in their rest position, and runs in the longitudinal direction, at an acute angle with respect to the sliding surfaces when the swivelling levers are in their rest position.

9. A sports device for sliding on an underlying surface, in particular a winter sports device, comprising:

at least two parallel elongated skates for engaging the underlying surface;

a forward crossbar and a rearward crossbar, each crossbar having an upper transverse portion and at least two laterally spaced prongs extending downwardly from the upper transverse portion;

a pivotal connection for attaching each skate to the lower ends of longitudinally aligned prongs on each of the forward and rearward crossbars with each prong extending upwardly and rearwardly relative to the attached skate, the pivotal connections providing pivotal movement of each skate about a lower pivot axis which is inclined relative to an upper planar surface of the skate;

first and second parallel elongated plates for supporting the feet of a user, a lever fixedly attached to opposite end portions of the first elongated plate along an inner side thereof, an upper pivotal connection for pivotally connecting a lower end of each lever to a first end of the upper transverse portion of each crossbar, and an upper pivotal connection for pivotally connecting opposite end portions of the second elongated plate to a second end of the upper transverse portion of each crossbar along an inner side of the second elongated plate, each upper pivotal connection having a pivot axis extending parallel with a respective lower pivot axis; and a spring connected between the inner sides of the first and second elongated plates for biasing the elongated plates to a neutral position.

* * * * *